(12) United States Patent  (10) Patent No.: US 9,449,416 B2
Chapman et al.  (45) Date of Patent: Sep. 20, 2016

(54) ANIMATION PROCESSING OF LINKED OBJECT PARTS

(75) Inventors: Danny Chapman, Oxford (GB); Thomas Lowe, Brisbane (AU)

(73) Assignee: Zynga Inc., San Francisco, CA (US)

( * ) Notice: Subject to any disclaimer, the term of this patent is extended or adjusted under 35 U.S.C. 154(b) by 523 days.

(21) Appl. No.: 13/408,049

(22) Filed: Feb. 29, 2012

(65) Prior Publication Data

US 2013/0222433 A1 Aug. 29, 2013

(51) Int. Cl.
*G06T 13/40* (2011.01)

(52) U.S. Cl.
CPC .................... *G06T 13/40* (2013.01)

(58) Field of Classification Search
CPC ....... G06T 13/00; G06T 13/20; G06T 13/40; G06T 2210/21
See application file for complete search history.

(56) References Cited

U.S. PATENT DOCUMENTS

| 7,403,202 | B1 * | 7/2008 | Nash | 345/474 |
|---|---|---|---|---|
| 7,864,180 | B1 * | 1/2011 | Baraff et al. | 345/473 |
| 2007/0129916 | A1 * | 6/2007 | Muller et al. | 703/2 |
| 2008/0170076 | A1 * | 7/2008 | Giroux et al. | 345/473 |
| 2010/0207949 | A1 | 8/2010 | Spencer | 345/473 |
| 2011/0267356 | A1 | 11/2011 | Rennuit | 345/473 |
| 2011/0267357 | A1 | 11/2011 | Rennuit | 345/473 |

FOREIGN PATENT DOCUMENTS

| EP | 1 288 867 A2 | 3/2003 |
|---|---|---|
| GB | 2499860 A | 9/2013 |
| GB | 2499860 B | 6/2016 |
| WO | WO 97/14102 A1 | 4/1997 |

OTHER PUBLICATIONS

Irving et al., "Invertible Finite Elements for Robust Simulation of Large Deformation," The Eurographics Association, 2004.*
Hodgins et al., "Adapting Simulated Behaviors for New Characters," ACM, 1997.*
The United Kingdom Search and Examination Report dated Nov. 15, 2012 (5 pages).
"United Kingdom Application Serial No. 1209821.6, Office Action mailed Jun. 18, 2012", 2 pgs.
"United Kingdom Application Serial No. 1209821.6, Office Action mailed Nov. 15, 2012", 5 pgs.
"United Kingdom Application Serial No. 1209821.6, Response filed Jan. 23, 2013 to Office Action mailed Nov. 15, 2012", 4 pgs.
"United Kingdom Application Serial No. 1209821.6, Response filed Jul. 18, 2012 to Office Action mailed Jun. 18, 2012", 1 pg.
"United Kingdom Application Serial No. 1209821.6, Response filed Jun. 10, 2015 to Office Action mailed Feb. 12, 2015", 4 pgs.
"United Kingdom Application Serial No. 1209821.6, Subsequent Examiners Report mailed Jul. 6, 2015", 2 pgs.

* cited by examiner

*Primary Examiner* — Kee M Tung
*Assistant Examiner* — Nicholas R Wilson
(74) *Attorney, Agent, or Firm* — Schwegman Lundberg & Woessner, P.A.

(57) ABSTRACT

The invention relates to a method and system of forming an animation of a virtual object within a virtual environment, and a storage medium storing a computer program for carrying out such a method. The virtual object comprises a plurality of object parts, and one or more predetermined object part groups each being a sequence of linked object parts. The method includes generating a target configuration for the parts of the object part group, using a scale factor to scale the target configuration.

20 Claims, 12 Drawing Sheets

ANIMATION PROCESSING OF LINKED OBJECT PARTS

FIELD OF THE INVENTION

The invention relates to a method of forming an animation of a virtual object within a virtual environment, a system for forming an animation of a virtual object within a virtual environment, and a storage medium storing a computer program for carrying out such a method.

BACKGROUND OF THE INVENTION

It is known to author or generate animation for one or more virtual objects (also termed "characters") that are located in a virtual environment, such as a three dimensional virtual environment of a video game or visual effects tool. Those characters can consist of a hierarchy of joints, or "rig", forming a skeleton which is used to animate a skin or mesh (as defined in US Patent Application Publication US 2010/0207949 A1, published 19 Aug. 2010, which is hereby incorporated in its entirety by reference). The characters may also have associated with them a physics definition in order to have a counterpart within a physics simulation which can influence the character's virtual environment via simulated physical interaction such as collision, and/or be influenced by such interactions and by the action of physical laws on the bodies comprised in the physics simulation.

Traditional animation techniques involve creating a sequence of joint geometries in an animation tool, which geometries specify the pose of the character at any given time instance. Those pre-authored animations can be blended and combined in various ways to produce a live animation at runtime.

Procedural animation involves generating new animation at runtime based on requirements (such as user control input and feedback from a physics simulation), and is particularly useful when the environment is dynamic or otherwise unpredictable. Inverse kinematics (as defined in US Patent Application publication US 2011/0267356 A1, published 3 Nov. 2011, which is hereby incorporated in its entirety by reference) is an example of a procedural tool that can be used to generate realistic interactions between a character and the environment. For instance, the character's legs may be manipulated to adjust foot placement for uneven terrain; its hands may be moved to reach and interact with objects; or its head and spine may be rotated to adjust gaze to fixate on other characters or other points of interest.

In one example, inverse-kinematic control involves specifying, for one or more object parts of a virtual object, a desired configuration (or pose/posture) for those object parts. An inverse-kinematics controller then calculates a configuration for the joints of the virtual object that would cause the one or more object parts to have a position and orientation such that the one or more object parts become as near coincident with the desired configuration as possible. One or more animation steps may be generated to animate movement of the object parts to the calculated configuration.

More sophisticated computation may be used to add more autonomy to the character so that the programmer or artist need not specify what actions to perform on a frame by frame basis; instead the character can be infused with a range of abilities (e.g. predefined functions in the form of software procedures) which autonomously control the character's motion in a way appropriate to its circumstances. For example, a balancing system allows the character to adjust its stance or take steps to retain an upright posture in the presence of external forces or other destabilising influences. A hazard protection system gives the character the ability to detect approaching objects and defend against them by, for instance, raising the arms, pushing the object away, or dodging to the side. By way of further example, a wound response system might sense collisions and have the character reach for the damaged body part while exhibiting other actions representing pain or distress. These abilities generate the above described desired configuration, which is used by the Inverse Kinematics controller.

It would be desirable to make the generation of animations easier and quicker.

SUMMARY OF THE INVENTION

By way of non-limiting example, there is disclosed a procedural animation engine which animates a virtual character so as to give it the appearance of autonomous intentional and intelligent response to a dynamic virtual environment. The engine may blend the influence of multiple behavioural components ("abilities"), and is so designed as to provide appropriate animations for a variety of character types with minimal retuning.

The example architectural design disclosed herein consists of a behaviour module which contains decision-making apparatus, which may process sensory information and may output control parameters to a controller module, which acts to animate the character. In certain embodiments, there may also be a physical simulation module which computes the character motion, with the controller influencing the simulation via virtual forces and other settings, rather than animating the character's attributes directly.

The concept of parameter space scaling, in combination with the use of "limb" abstractions is disclosed. In certain embodiments, a reference parameter space is used for internal and user-defined measurements and settings which are mapped onto the character's parameter space by a pre-computed scaling. This makes it possible to design actions that are independent of scale.

In some embodiments, the control parameters output by the behaviour module are so-called "limb controls" which represent inverse-kinematic configuration targets for each one of a number of generalised articulations, also termed "limbs". Thereby such a system can control any topologically similar character having appropriate mark-up (mark-up which describes the topology of the character), regardless of the precise geometry, or number and arrangement of joints. In some embodiments, "similar" means that the limbs are connected together in a similar order and placement—arms and head attached to the top of the spine, legs to the bottom. However there is plenty of leeway in the precise arrangement.

Together, parameter space scaling and limb abstraction make the system applicable to a wide range of different character types, largely independent of the character geometry, topology, build, and the units in which its properties are defined.

According to a first aspect of the invention, there is provided a method for forming an animation of a virtual object within a virtual environment, the virtual object comprising a plurality of object parts, there being one or more predetermined object part groups, each object part group being a sequence of linked object parts, the virtual object having, in respect of one or more properties for the virtual object, a respective scale factor specifying a value of the property for the virtual object relative to a reference value for that property, the method comprising, for each object part group of the one or more predetermined object part groups: generating a target configuration for one or more object parts of the object part group by: providing a first set of one or more parameters, relating to a next step of the animation, to a predetermined function; said predetermined function determining, based on the first set of one or more parameters, a configuration for one or more object parts of the object part group; and providing said target configuration to a control module arranged to control the object parts in the object part group based on the target configuration so as to try to achieve the target configuration; wherein said generating uses one or more of said one or more scale factors so that the target configuration is scaled according to said values of said one or more properties for the virtual object.

The method may further comprise: receiving a second set of one or more parameters; modifying said second set of one or more parameters to form said first set of one or more parameters so that all parameters of said first set of one or more parameters are scaled according to said reference values for said one or more properties; and scaling said determined configuration using said one or more scale factors to generate said target configuration.

Alternatively, the method may further comprise: receiving a second set of one or more parameters; and modifying said second set of one or more parameters to form said first set of one or more parameters by scaling one or more parameters of said second set of parameters using said one or more scale factors so that all parameters of said first set of one or more parameters are scaled according to said values of said one or more properties for the virtual object.

In some embodiments, each scale factor represents a ratio between the value of the respective property for the virtual object and a reference value for that property.

In some embodiments, at least one of the scale factors is pre-computed.

In some embodiments, each scale factor relates to one of mass, length and time units.

In some embodiments, each scale factor is a combination of two or more sub-scale factors, each sub-scale factor relating to one of mass, length and time units.

In some embodiments, a length scale factor is defined as a value of a height property of the virtual object relative to a reference height.

In some embodiments, a length scale factor is defined as a value of a combined length of a particular set of the object parts of the virtual object, relative to a reference length.

In some embodiments, a mass scale factor is defined as the value of a mass property of the virtual object relative to a reference mass.

In some embodiments, a time scale factor is the value of a time taken for the virtual object to fall its own height under the influence of a predetermined acceleration relative to a reference time.

In some embodiments, the predetermined function corresponds to a particular type of object part group.

In some embodiments, the type of object part group is one of an arm group, a leg group, a spine group and a head group.

In some embodiments, the control module is arranged for controlling that particular type of object part group.

In some embodiments, the method further comprises the step of rendering an animation update step, the rendering at least partially based upon the target configuration. In some embodiments, the method further comprises the step of displaying the rendered animation update step on a display.

In some embodiments, the predetermined function determines the determined configuration based at least partially upon functionality relating to one or more behavioural abilities of the virtual object. The behavioural abilities may include one or more abilities, each relating to at least one of balance, hazard protection, wound response, pointing, looking and aiming.

In some embodiments, the predetermined function determines the determined configuration based at least partially upon functionality relating to a plurality of the abilities, and resolves between the plurality. The resolving may be based upon one or more weighting parameters that define how strongly each of the abilities are to be acted upon.

According to second aspect of the invention, there is provided a system for forming an animation of a virtual object within a virtual environment, the virtual object comprising a plurality of object parts, there being one or more predetermined object part groups, each object part group being a sequence of linked object parts, the virtual object having, in respect of one or more properties for the virtual object, a respective scale factor specifying a value of the property for the virtual object relative to a reference value for that property, the system comprising a processor arranged to, for each object part group of the one or more predetermined object part groups: generate a target configuration for one or more object parts of the object part group by: providing a first set of one or more parameters, relating to a next step of the animation, to a predetermined function; said predetermined function determining, based on the first set of one or more parameters, a configuration for one or more object parts of the object part group; and provide said target configuration to a control module arranged control the object parts in the object part group based on the target configuration so as to try to achieve the target configuration; wherein said generating uses one or more of said one or more scale factors so that the target configuration is scaled according to said values of said one or more properties for the virtual object.

This system may be arranged to carry out any of the above-described methods.

According to a third aspect of the invention, there is provided a storage medium storing a computer program which, when executed by a computer, carries out a method for forming an animation of a virtual object within a virtual environment, the virtual object comprising a plurality of object parts, there being one or more predetermined object part groups, each object part group being a sequence of linked object parts, the virtual object having, in respect of one or more properties for the virtual object, a respective scale factor specifying a value of the property for the virtual object relative to a reference value for that property, the method comprising, for each object part group of the one or more predetermined object part groups: generating a target configuration for one or more object parts of the object part group by: providing a first set of one or more parameters, relating to a next step of the animation, to a predetermined function; said predetermined function determining, based on the first set of one or more parameters, a configuration for one or more object parts of the object part group; and providing said target configuration to a control module arranged control the object parts in the object part group based on the target configuration so as to try to achieve the target configuration; wherein said generating uses one or more of said one or more scale factors so that the target configuration is scaled according to said values of said one or more properties for the virtual object.

The method for the third aspect of the invention may be any of the above-described method for embodiments of the first aspect of the invention.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description and Figures that follow, certain embodiments of the invention are described. However, it will be appreciated that the invention is not limited to the embodiments described, and that some embodiments may not include all of the features that are described in the embodiments below. Further, it will be evident that various modifications and changes may be made without departing from the spirit and scope of the invention as defined in the appended claims.

System Architecture

Figure 1:
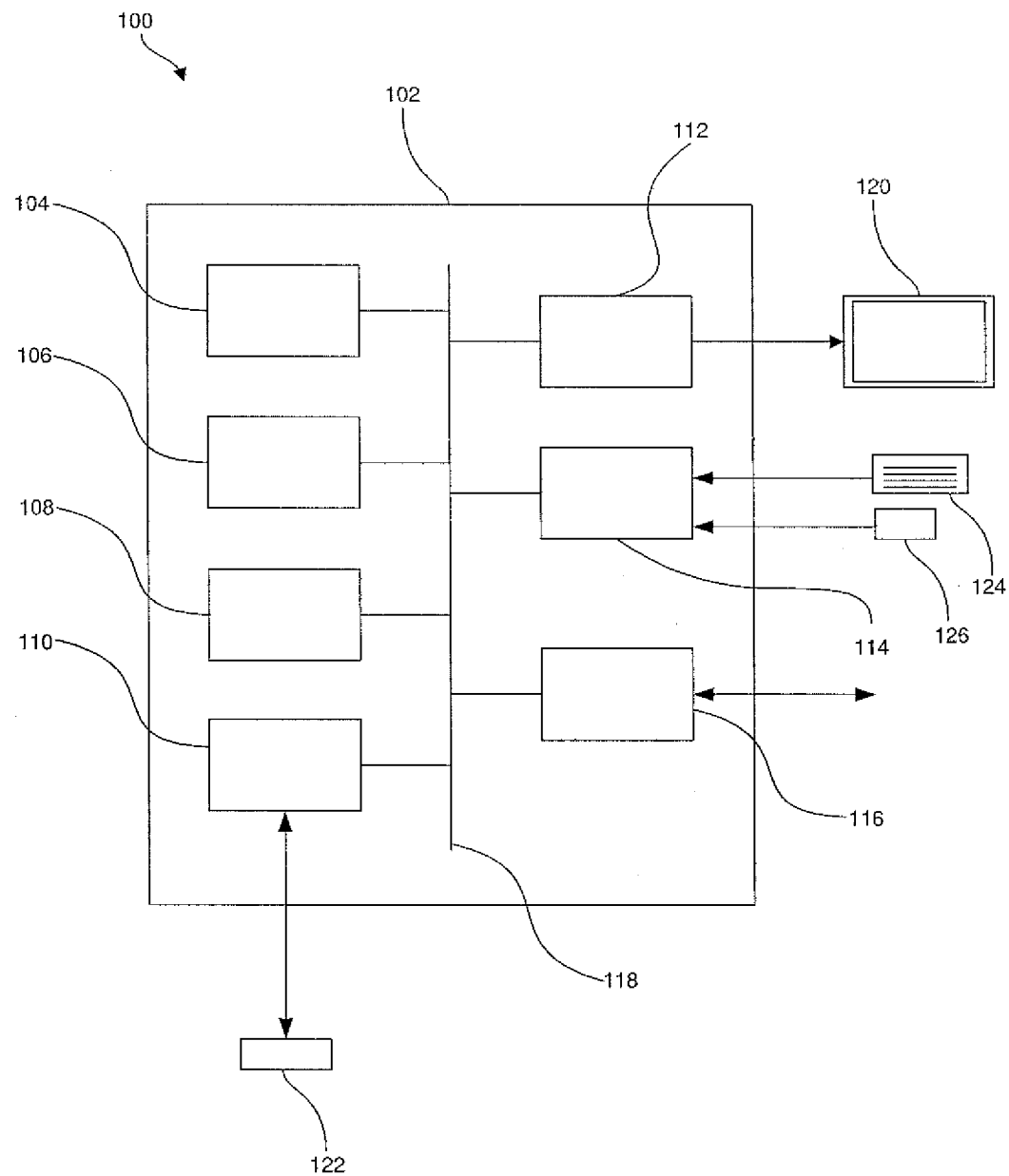
FIG. 1 schematically illustrates an example computer system according to an embodiment of the invention.

Embodiments of the invention may be executed by a computer system. FIG. 1 schematically illustrates an example computer system 100 according to an embodiment of the invention. The system 100 comprises a computer 102. The computer 102 comprises: a storage medium 104, a memory 106, a processor 108, a storage medium interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code) that form part of an embodiment of the invention.

The memory 106 may be any random access memory (storage unit or volatile storage medium) suitable for storing data and/or computer programs (or software or instructions or code) that form part of an embodiment of the invention.

The processor 108 may be any data processing unit suitable for executing one or more computer programs (such as those stored on the storage medium 104 and/or in the memory 106) which have instructions that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The storage medium interface 110 may be any unit for providing an interface to a data storage device 122 external to, or removable from, the computer 102. The data storage device 122 may be, for example, one or more of an optical disc, a magnetic disc, a solid-state-storage device, etc. The storage medium interface 110 may therefore read data from, or write data to, the data storage device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices. The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112.

Finally, the network interface 116 provides functionality for the computer 102 to download data from and/or upload data to one or more data communication networks (such as the Internet or a local area network).

It will be appreciated that the architecture of the system 100 illustrated in FIG. 1 and described above is merely exemplary and that other computer systems 100 with different architectures and additional and/or alternative components may be used in embodiments of the invention.

Animations and Data for Animations

Figure 2:
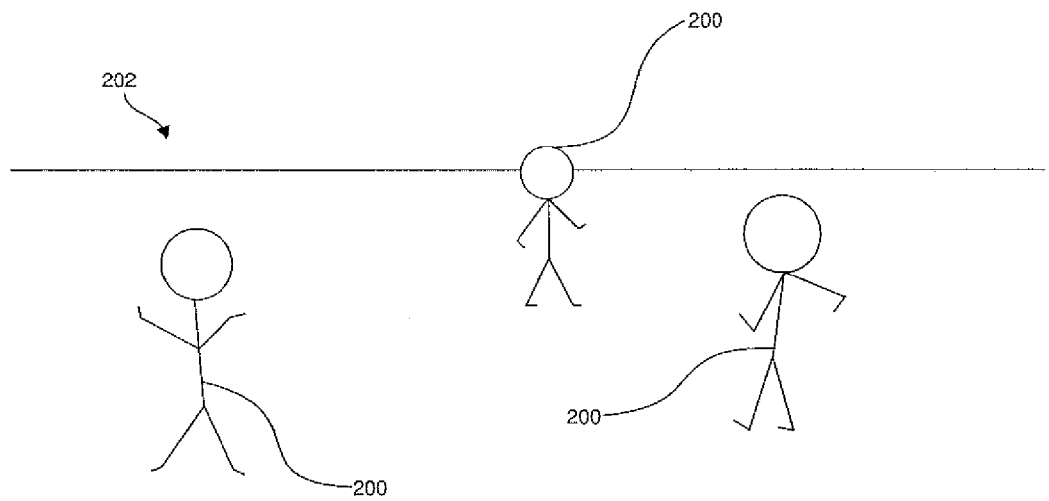
FIG. 2 schematically illustrates example virtual objects within a virtual world.

Embodiments of the invention are concerned with animations and, in particular, an animation of a virtual object (or a character) that is located (or resides) within a virtual world (or environment). FIG. 2 schematically illustrates three example virtual objects 200 within a virtual world 202. The virtual objects 200 shown in FIG. 2 (and the rest of this application) represent human beings, but it will be appreciated that embodiments of the invention are equally applicable to animations of virtual objects that represent other articles, items, animals, etc. and other types, structures and forms of object that have different intended representations. The virtual world 202 may be any virtual environment, arena or space containing the virtual objects 200 and in which the virtual objects 200 may be moved or animated. Thus, the virtual world 202 may represent a real-world location, a fictitious location, a building, the outdoors, underwater, in the sky, a scenario/location in a game or in a movie, etc. The animation of the virtual object 200 may form a part of a computer game being executed by the processor 108 of the computer system 100, with the animation being generated/computed in real-time. The animation of the virtual object 200 may be generated/computed so as to output a video animation to form part of a film/movie (in which case the generation/computation need not be in real-time). The animation of the virtual object 200 may be generated/computed for other purposes (e.g. computer simulations that involve objects moving and interacting in an environment).

An animation for an object 200 comprises performing an update process at each time point (also referred to as an animation update step) in a series of time points (or a series of animation update steps or update time points). These time-points may correspond to video frames, video fields, or any other time or display frequency of interest—for the rest of this description, the time-points shall be assumed to correspond to video frames, but it will be appreciated that this is only an example and should not be taken as limiting. For example, in some embodiments, one or more animation update steps may be carried out between successive video frames/fields and this number may or may not be constant over time. It will be appreciated that the display frequency (i.e. the frequency at which a display process displays or renders an image of the virtual world 202) need not necessarily be linked to the frequency of performing the update process. The update process performed at the animation update step updates values for attributes of (or associated with) the object 200. These attributes may correspond to, for example, the location and/or orientation of one or more object parts of the object 200 (e.g. the location and/or orientation of the limbs, neck, digits, head, etc. of a human object 200). Thus, in updating the values for the location and/or orientation object attributes, the object 200 is moved within the virtual world 202. However, the attributes associated with the object 200 are not limited to location and/or orientation object attributes, as discussed below.

In the embodiments described below, the animations relate to so-called "skeletal animation", but it will be appreciated that different types or styles of animation fall within the scope of the present invention. The object attributes for an object 200 may be represented by some or all of the following data (depending on the type of animation and how the object 200 and its attributes are to be represented): (a) topological data; (b) geometric data; (c) physical data; (d) trajectory data; (e) skinning data; and (f) rendering data. These data are described in more detail below. It will be appreciated that the object 200 may have attributes in addition to, or as alternatives to, the attributes as described further below with reference to the various data (a)-(f).

Figure 3:
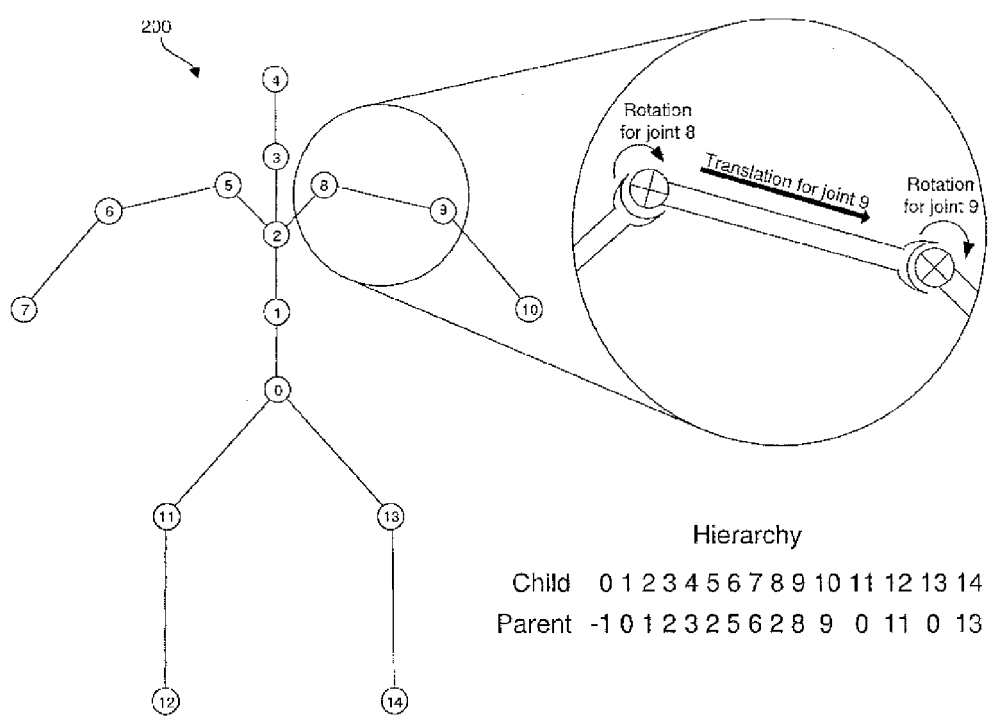
FIG. 3 schematically illustrates an object for an animation according to an embodiment of the invention.

FIG. 3 schematically illustrates an object 200 for an animation according to an embodiment of the invention. The object 200 comprises a plurality of object sections (or "bones") linked together by respective joints. In FIG. 3, the sections of the object 200 are the straight lines whilst the joints of the object 200 are the numbered circles.

In general, a joint is a (simulated) point or surface or location of contact between two or more object sections so that that joint links (or creates an association between) those sections. In other words, such a joint forms a simulated connection or tie between object sections (in the same way that, for example, a forearm is connected to an upper arm by virtue of an elbow joint). In this way, an object section may have one or more joints associated with it. A joint normally occurs at an end of the object section(s) it is associated with.

Some joints (such as joint 10 in FIG. 3) occur at the end of an object section, but do not link that section to another section. These joints merely serve to indicate the location of the free (i.e. unconnected) end of that section.

In some embodiments, each object section is "rigid" in that the distance between the joints associated with that section is constant, although, of course, each rigid section may have its own length/distance which may be different from the length/distance for the other rigid sections. However, it will be appreciated that in other embodiments one or more of the sections of the object 200 may not be "rigid".

The object 200 may therefore be considered to comprise a plurality of object parts. In some embodiments, the topological data represents the object 200 as a plurality of joints (i.e. the object parts are just the joints). In some embodiments, the topological data represents the object 200 as a plurality of object sections (i.e. the object parts are just the bones). In some embodiments, the topological data represents the object 200 as a plurality of joints together with a plurality of object sections. The actual representation does not matter for embodiments of the invention and therefore in this description the topological data shall represent the object 200 as a plurality of joints and it will be appreciated that the use herein of the term "joint" encompasses both joints and/or bones unless stated otherwise or unless clearly not appropriate. However, the skilled person will appreciate that the following description may be applied analogously to the alternative styles of representation.

The object parts may be considered as forming a skeleton, or framework, for the object 200.

The object parts (joints in this representation) are linked together, or are associated with each other, in a hierarchy. The hierarchy of joints illustrated in FIG. 3 may be represented by table 1 below:

TABLE 1

| | Joint ID | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Parent ID | -1 | 0 | 1 | 2 | 3 | 2 | 5 | 6 | 2 | 8 | 9 | 0 | 11 | 0 | 13 |

In this hierarchy of joints for the object 200, each joint, other than a central, basis root joint (labelled with a joint ID of 0) is a child of another joint in the hierarchy, i.e. every joint other than that root joint is associated with (or linked to) a second joint in the hierarchy (by virtue of a connecting object section), where that second joint is considered to be the parent of that joint. The fact that the central joint is not a child of another joint (and therefore has no parent joint) is represented in table 1 by indicating a parent ID of -1. For example, joint 2 is a child of joint 1 and itself has three children, namely joints 3, 5 and 8. As another example, joint 10 is a child of joint 9, but has no children itself. A joint such as joint 10 that has no child joints (i.e. a joint that is not itself a parent) is included so as to represent a "terminating end" of a section of the object 200, i.e. to indicate the location of the extremities of the object 200. Due to the connecting nature of the object sections that link joints, the movement, position and orientation of a joint in the virtual world 202 is affected by the movement, position and orientation of the parent of that joint in the virtual world 202.

Figure 4:
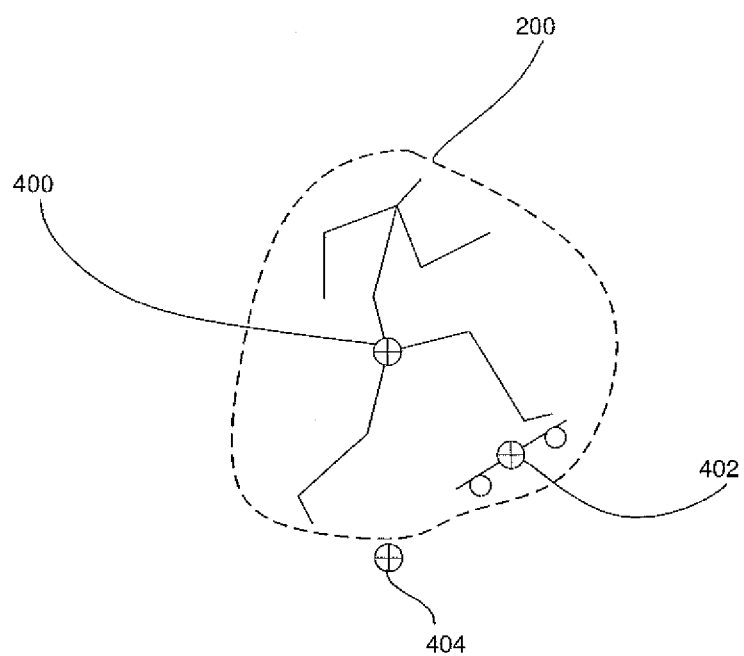
FIG. 4 schematically illustrates a compound object.

An object may have multiple root joints. For example, FIG. 4 schematically illustrates a compound object 200 representing a person on a skateboard. This may be considered as being one object as the person and the skateboard may be considered to be one set of semantically linked data (i.e. a single character). However, as the person and the skateboard are not rigidly or permanently attached to each other, they each have their own root joints, namely a root joint 400 for the person and a root joint 402 for the skateboard. The joints for the person will then be hierarchically related to the root joint 400, whilst the joints for the skateboard will be hierarchically related to the root joint 402.

The topological data for the object 200 is data that represents this hierarchy (or hierarchies) or structure of the object parts, i.e. data defining the parent-child relationships between the various object parts that make up the object 200. For example, the topological data for the object 200 may be stored in the form of table 1 above.

The geometric data for the object 200 represents the relative positions and orientations of the object parts. The values given to the geometric data represent the positioning or configuration of the object 200 in a particular posture or stature. In effect, the attributes for the object 200 represented by the geometric data are the length of each object section (bone) together with that bone's orientation relative to its parent bone, i.e. this geometric data represents the distance between a joint and its parent joint, together with the orientation of that joint relative to the parent joint. There are many well-known ways of representing this geometric data, such as: (a) using respective transformation matrices for the joints; (b) using respective pairs of 3×3 rotation matrices and 1×3 translation matrices; or (c) using respective quaternions. As these methods are well-known, and as the particular method used is not important for embodiments of the invention, these methods shall not be described in more detail herein. An example representing some of the geometric data for joints 8 and 9 is shown in FIG. 3.

The geometric data for a particular joint is normally defined in a coordinate space local to the parent of that joint (i.e. in which that parent is fixed). Thus, for example, if a "shoulder joint" 8 of FIG. 3 moves but the "elbow joint" 9 of FIG. 3 does not move relative to the shoulder joint, then the geometric data 308 for the elbow joint would not change.

The attribute of the object 200 represented by the trajectory data is the location and orientation in the virtual world 202 of a so-called "trajectory joint" 404 for the object 200 (shown in FIG. 4 but not shown in FIG. 3). The trajectory joint 404 is used as a representative location of the object 200 within the world 202. Thus, different values for the trajectory data place the trajectory joint 404 (and hence the object 200) at different locations in the virtual world 202.

The trajectory joint 404 is usually not an actual joint of the object 200 (i.e. it need not form part of the structure of the object 200), but is simply a position and orientation within the world 202 to represent the overall location and orientation for the object 200. For convenience, the trajectory joint 404 may be represented as a "special" joint within the hierarchy represented by the topological data. The trajectory joint 404 need not be a root joint (with no parent) but can be located anywhere within the skeleton topology as represented by the topological data. However, it is generally the location and orientation of the joints of the object 200 (as specified by virtue of the topological data and the geometric data) relative to the trajectory joint 404 that is important as this results in a particular joint or object section being at a particular/absolute position and orientation within the entire virtual world 202. One way of viewing or implementing this is for all joints of the object 200 (as specified by the topological data), including root joints, to be ultimately parented to the trajectory joint 404 so that their location and orientation within the virtual world 202 can be calculated based on the trajectory data, the topological data and the geometric data.

The orientation of a trajectory joint 404 is just as important as its position, as it represents the overall direction that the object 200 is "facing".

Figure 5:
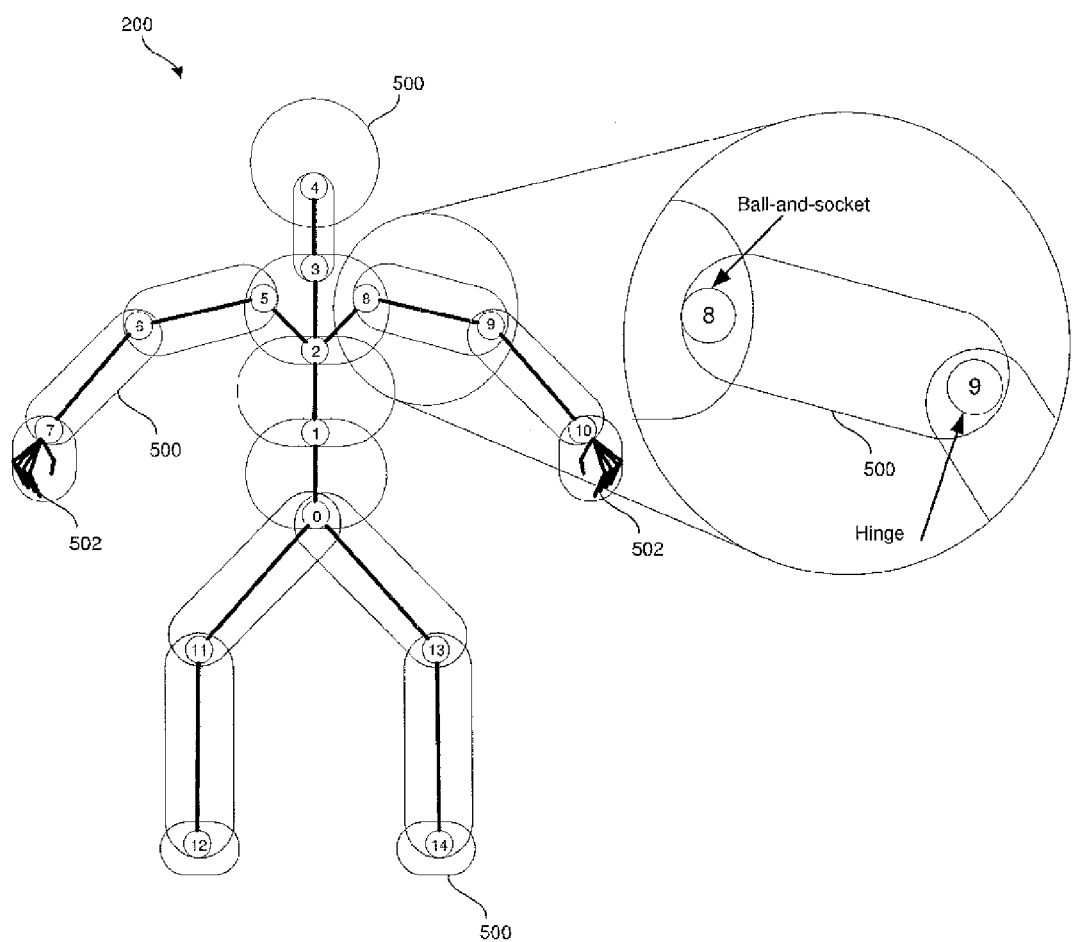
FIG. 5 schematically illustrates regions around joints of the object of FIG. 3 as defined by physical data for the object of FIG. 3.

The physical data represents various physical attributes (or "properties") for the object 200. These physical attributes represent or impose various physical properties or restrictions or limitations on the object 200. Typically, subsets of the physical data are associated with respective joints represented by the topological data. For example, one or more of the joints (or bones) represented by the topological data may have corresponding physical data representing attributes such as:

Size and shape of a region around that joint. The region may be a capsule or a cylinder, with the size and shape being defined by lengths and radii accordingly. The region may represent the body, or the "bulk", of the object 200 that is supported by the framework of bones and joints. If another object 200 were to enter, penetrate or perhaps even just contact this region, then the two objects 200 may be considered to have collided. FIG. 5 schematically illustrates such regions 500 for the joints for the object 200.

A mass for the joint.

An inertia property for the joint.

Other properties of the joint such as stiffness, damping factors, type of joint. For example, the "shoulder" joint 8 in FIG. 5 may be a ball-and-socket joint whilst the "elbow" joint 9 in FIG. 5 may be a hinge joint. Such data may therefore restrict or constrain how one joint may move (e.g. hinge or rotate or pivot) with respect to another joint (a parent or a child joint).

However, as shown in FIG. 5, some of the joints 502 represented by the topological data may not have corresponding physical attributes.

The skinning data is data that enables so-called "skinning" for the animation. The process of skinning is well-known in this field of technology and shall not be described in more detail herein—it takes a definition of the surface of the object 200 and attaches it to the skeleton formed by the object parts (the joints and/or bones). The skinning data is therefore data defining this object surface, which is an attribute of the object 200.

The rendering data is data that enables so-called "rendering" of the animation. The process of rendering is well-known in this field of technology and shall not be described in more detail herein—it actually outputs or displays the skinned surface with relevant textures, colours, lighting, etc. as appropriate. The rendering data is therefore data defining the textures, colours, lighting, etc., which are attributes of the object 200.

Figure 6:
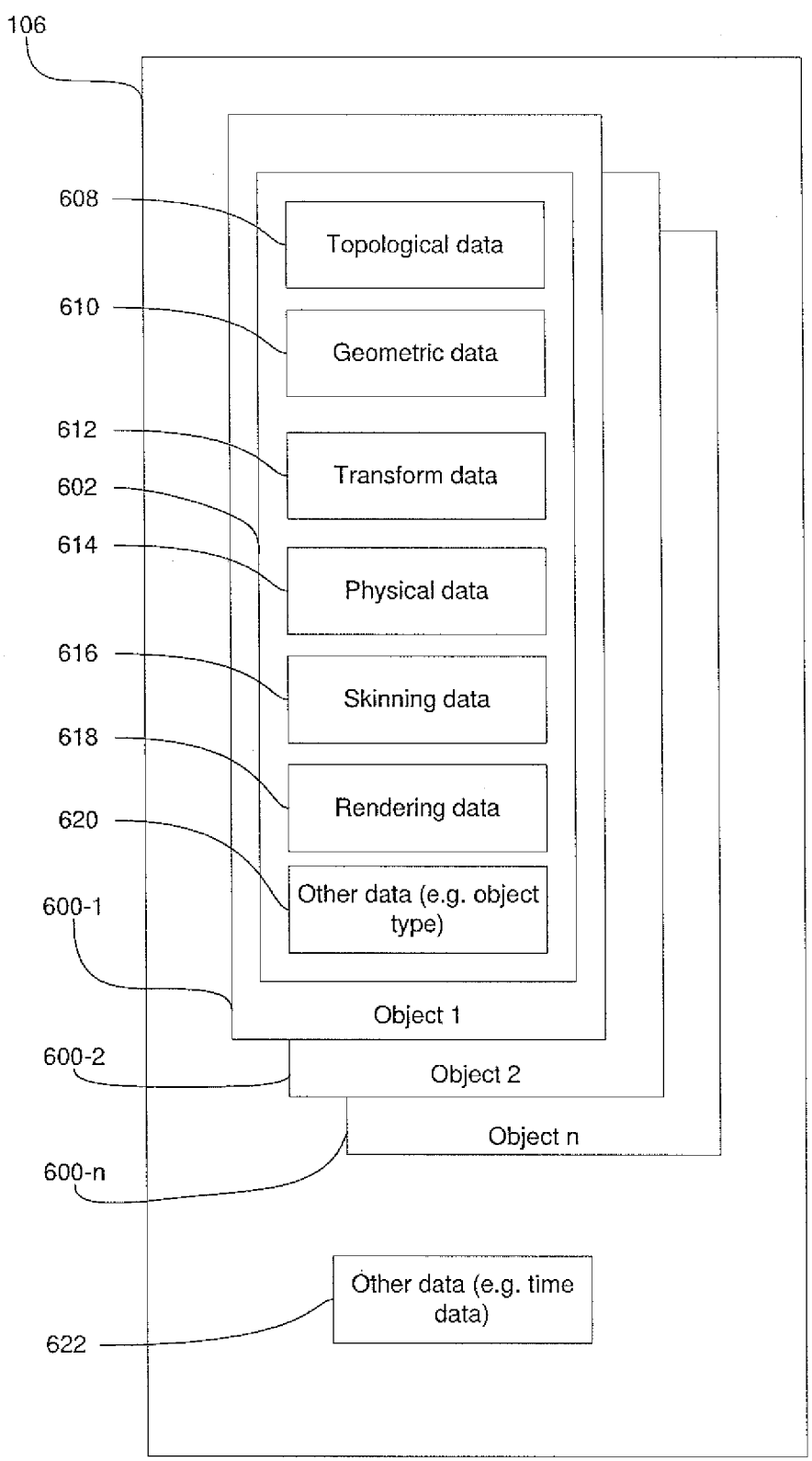
FIG. 6 schematically illustrates some of the data that may be stored in a memory of the computer system of FIG. 1 for embodiments of the invention.

FIG. 6 schematically illustrates some of the data that may therefore be stored in the memory 106 (or additionally or alternatively stored in the storage medium 104 or the data storage device 122, or which may be accessible via the network interface 116). There may be respective data 600 for one or more objects 200—in FIG. 6, there are n objects 200, each with their own data 600-1, 600-2, ..., 600-n. The data 600 for an object 200 may include a set 602 of attribute data for that object 200, including one or more of: topological data 608; geometric data 610; trajectory data 612; physical data 614; skinning data 616; rendering data 618; and other data 620 specific to that object (e.g. a type of the object 200). There may also be stored other data 622 (such as data defining a time within a computer game or a movie; data defining or describing the virtual world 202; etc.) which is not specific to any one particular object 200.

Control for Object Parts

Embodiments of the invention involve applying control to an object part (joint or bone) of a virtual object 200 in the virtual world 202 so as to determine and/or cause movement of that object part within the virtual world 202, thereby generating an animation of the virtual object 200. This is described in detail below with reference to FIGS. 7A and 7B. As mentioned above, the object part shall be considered to be a joint of the virtual object 200, but the description below applies equally to applying control to a bone of the virtual object 200.

Figure 7A:
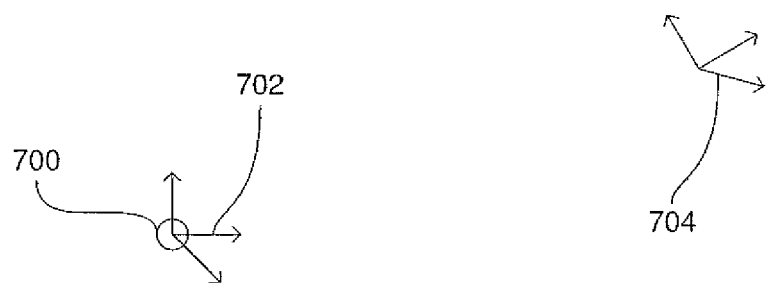
FIGS. 7A and 7B schematically illustrate a control frame and a target frame for an object part.
Figure 7B:
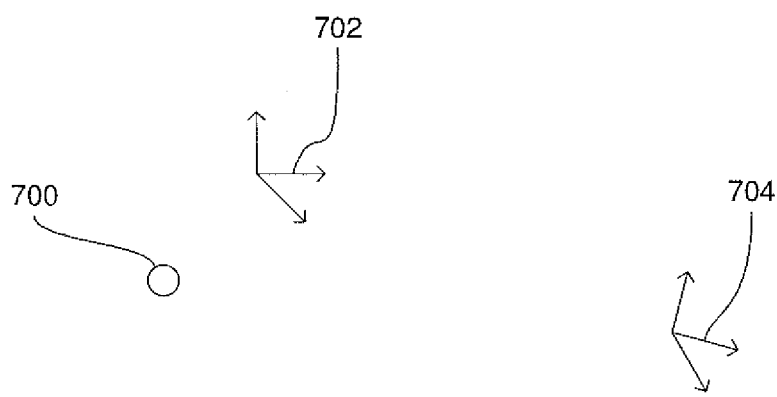

As shown in FIGS. 7A and 7B, a joint 700 has an associated frame 702 which shall be referred to as a "control frame" 702. Here, a "frame" defines a respective origin and set of axes. This may also be viewed as a "frame" defining a respective location and orientation at that location. The control frame 702 may be defined with respect to a "world" frame for the entire virtual world 202 (which may be predetermined, at least for a current time point, or may be fixed or not fixed). However, it will be appreciated that the control frame 702 may be defined with respect to a frame fixed at the joint 700 or with respect to any other frame. The control frame 702 is not necessarily fixed within the frame that it is defined with respect to. However, the control frame 702 is at a known (or specified) position and orientation in the virtual world 202 relative to the joint 700. This position and orientation may be predetermined or fixed relative to the joint 700, although this need not be the case and may change from one update time point to another update time point. As such, movement of the joint 700 within the virtual world 202 causes the control frame 702 to be updated so as to maintain its position and orientation in the virtual world 202 relative to the joint 700. The control frame 702 may be considered as "rigidly" linked/attached to the joint 700.

In FIG. 7A, the control frame 702 may have its respective origin/location coincident with the position of the joint 700 within the virtual world 202 (as specified by the geometric data for the object 200). The orientation of the control frame 702 may also be the same as the orientation of the joint 700 (as specified by the geometric data for the object 200), but this need not be the case. As shown in FIG. 7B, the respective origin/location of the control frame 702 may be different from the position of the joint 700 within the virtual world 202 (as specified by the geometric data for the object 200).

Animation of the object 200 comprises specifying a frame 704 in the virtual world 202 for the joint 700, which shall be referred to as a "target frame" 704 for the joint 700. Again, a "frame" defines a respective origin and set of axes, and this may also be viewed as a "frame" defining a respective location and orientation at that location. Again, the target frame 704 may be defined with respect to a predetermined frame, which may be a "world" frame for the entire virtual world 202 (which may be predetermined, at least for a current time point, or may be fixed or not fixed) or may be any other frame such as a frame fixed at the joint 700. Animation of the object 200 then comprises applying control to the joint 700, wherein the control is arranged such that the application of the control in isolation to the joint 700 would cause a movement of the joint 700 in the virtual world 202 that reduces the difference between the control frame 702 and the target frame 704. Here, the "difference" between the control frame 702 and the target frame 704 includes one or both of the distance between the respective origins/locations defined by the control frame 702 and the target frame 704 and the difference between the respective orientations of the control frame 702 and the target frame 704. Thus, reducing the difference between the control frame 702 and the target frame 704 may involve one or both of: (a) reducing the distance between the respective origins/locations defined by the control frame 702 and the target frame 704; and (b) reducing the difference between the respective orientations of the control frame 702 and the target frame 704. The aim, then, of applying control to the joint 700 is to try to move the joint 700 within the virtual world 202 so that the control frame 702 substantially coincides with the target frame 704 (in terms of position and/or orientation).

The application of "control" to the joint 700 shall be described in more detail later. It will be appreciated that the joint 700 may be connected to one or more other joints 700 (either directly or indirectly) to which control is also being applied. As discussed above, the movement of one joint may affect the position and orientation of another joint (e.g. the movement of a parent joint affects the position and orientation of a child joint). Hence, the application of the control to the joint 700 is such that, the control when applied "in isolation" to the joint 700 would cause a movement of the joint 700 in the virtual world 202 that reduces the difference between the control frame 702 and the target frame 704— however, the overall result of control being applied to multiple joints of the object 200 may have a different result, i.e. multiple controls being applied to multiple respective object parts may result in a different effect for a particular object part than would have resulted from the application of just that particular object part's control. Additionally, other influences may affect the movement, position and orientation of the joint 700. Such other influences could be, for example, the actual model being used within the virtual world 202 for the virtual object 200 (such as the simulation of gravity acting on the joint 700), the application of one or more other virtual wrenches to/on the virtual object 200, and/or a collision of the joint 700 or the virtual object 200 with another virtual object 200 within the virtual world 202. However, the intention is that, in the absence of other control being applied to the other joints of the object 200 and in the absence of other influences affecting the movement, position and orientation of the joint 700, the application of the specific control to the joint 700 would cause a movement of the joint 700 in the virtual world 202 that reduces the difference between the control frame 702 and the target frame 704.

Limbs

Figure 9:
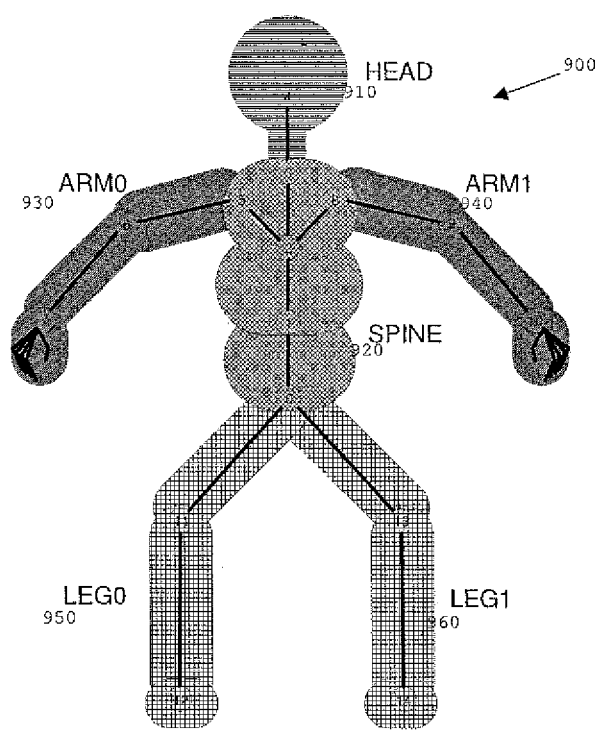
FIG. 9 schematically illustrates a virtual object having limbs according to an embodiment of the invention.

A character may comprise one or more so-called "limbs", also referred to herein as an "object part group". Each limb comprises a sequence (or series or chain) of linked/connected object parts of the virtual object. This sequence of object parts commences with a start object part and terminates with an end object part, and there may be zero or more intermediate object parts in the sequence between the start object part and the end object part. FIG. 9 schematically illustrates the concept of limbs (or object part groups). In particular, in FIG. 9, a character (which is the same as the character illustrated in FIG. 3) is shown as comprising six object part groups labelled 910, 920, 930, 940, 950 and 960. For example, referring to FIGS. 3 and 9, the limb 940 labelled ARM1 has a start object part 8 and an end object part 10, with an intermediate object part 9. The start object part and the end object part are the boundaries of the sequence of object parts belonging to the limb. As illustrated, there are so-called arm limbs 940 and 930, leg limbs 950 and 960, a spine limb 920 and a head limb 910, although it will be appreciated that different characters may have different sets of limbs and the limbs may take different configurations, not all of the limb types illustrated in FIG. 9 need be present for a character and, indeed, different types of limbs may be used for different characters. As will be evident from the above, the term "limb" shall not be taken to mean simply an arm or a leg of a character, but is intended to mean any sequence (or series or chain) of linked/connected object parts. For example, a limb may represent a spine of a character (such as the spine limb 920 in FIG. 9, which comprises the joints 0, 1, 2, 3, 5 and 8); a limb may represent a head of a character (such as the head limb 910 of FIG. 9, which comprises the joints 3 and 4).

Data defining the one or more object part groups of a virtual object may be stored as part of the data 600 for that virtual object (for example as part of the topological data 608 or as part of the other data 620). This data may be predetermined for the virtual object. This data may specify, for example, the particular object parts for the object part group and/or a type for the object part group (such as "arm", "leg", "spine", "neck", "head", etc.) and/or other characteristics of the object part group (such as a default posture for that object part group, weights of, or constraints on, the object parts involved, etc.).

In More Detail

Figure 8:
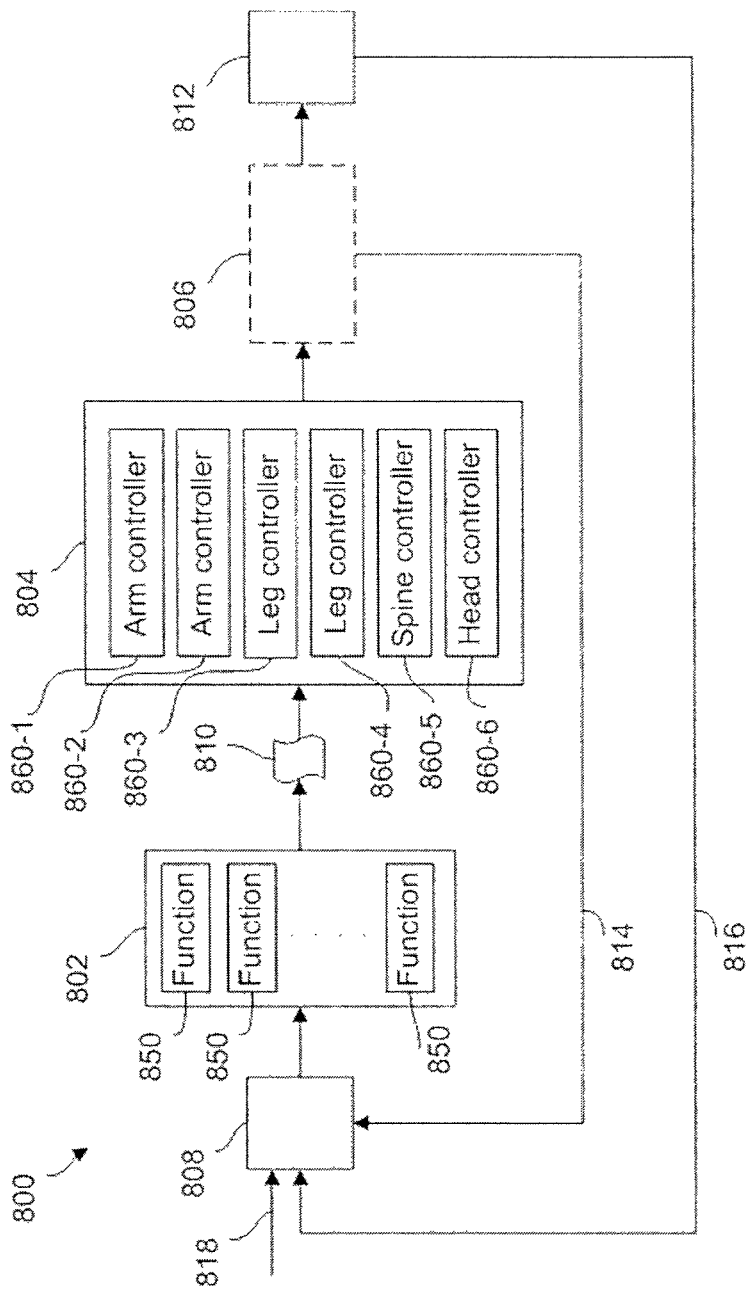
FIG. 8 schematically illustrates a system according to an embodiment of the invention.

FIG. 8 schematically illustrates an example system 800 according an embodiment of the invention. The system 800 comprises a behaviour module 802, a controller module 804 and an optional physics module 806. In summary, the behaviour module 802 is arranged to receive a set of input parameters 808 (or data or information) and to determine, from this set of input parameters 808, a target configuration 810 for a character 812 (or virtual object). This target configuration 810 is received by the controller module 804. The controller module 804 is arranged to control the object parts making up the character 812 in order to try to achieve the target configuration 810 (as described above with reference to FIGS. 7A and 7B).

The optional physics module 806 may be used to simulate virtual forces and associated reactions of the character 812 and/or its virtual environment. The physics module 806 may simulate the application of (and the resulting effects of) virtual forces and/or virtual torques and/or virtual wrenches to the character 812, based upon the output of the controller module 804, in order to control the character 812 to try to achieve the target configuration 810 for the character 812. Such physics modules are well-known and shall, therefore, not be described in more detail herein.

Each parameter in the set of one or more input parameters 808 may be an amount of data or a value representing a quantity intended to influence or control the behaviour (or animation or movement) of the character 812 for a next animation update step of the animation. The set of input parameters 808 may, therefore, include one or more parameters that are one or more of:

- Inputs 818 from a user (or some other controller of a game or animation tool). For example, the user inputs 818 may identify a desired movement of the character 812, potentially including one or more properties of the movement such as a direction in which the character 812 is to move, a style in which the character 812 is to move, etc. (e.g. "move left", "crouch", "run at 70% of maximum running speed", etc.).
- One or more predetermined inputs (such as default animation data for the character).
- Feedback 814 from the physics module 806, which may indicate how the character 812 has interacted with the virtual environment (this is referred to as "perception"). This perception feedback 814 could include, for example, an indication that a part of the character 812 has collided with a part of its virtual environment, or that the character is approaching another object within the virtual environment (with the intention then being that the character 812 should then be animated to take an evasive or protective manoeuvre).
- Feedback 816 from the character 806 in relation to itself (referred to as proprioception). This proprioception feedback 816 could include, for example, an indication that a part of the character 812 has contacted another part of the character 812.
- Other data or information about the state of the character 812 and/or the virtual environment.

The behaviour module 802 comprises, or is arranged to execute, one or more predetermined functions 850. The predetermined functions 850 each make use of one or more of the parameters from the set of input parameters 808 to influence how the character 812 is to be animated. The behaviour module 802 uses the outputs of the predetermined functions 850 to determine, for each of the limbs of the character 812, a configuration for one or more object parts of the limb. The behaviour module 802 passes data (namely the target configuration 810 in FIG. 8) that represent the determined configurations to the controller module 804.

The predetermined functions 850 may be viewed as "abilities" for the character 812. For example one or more of the following may be implemented for the behaviour module 802:

- One predetermined function 850 may be arranged to try to control the limbs of the character 812 so as to simulate how the character 812 would respond to being "wounded" (for example when the input parameters 808 indicate that the character 812 has been wounded). This may be achieved by controlling an arm limb so that a simulated hand at the end of the arm limb will be moved to cover, or be located at, the wound.
- Another predetermined function 850 may be arranged to control the limbs of the character 812 so as to try to cause the character 812 to remaining in a balanced posture. Such a function may make use of input parameters 808 that specify the nature of the surface on which the character 812 is positioned, together with input parameters 808 specifying other forces that may be acting on the character 812.
- Another predetermined function 850 could be arranged to control the limbs of the character 812 to simulate the character 812 defending itself from an attack, such as by moving arm or leg limbs so block or repel an incoming object. Such a predetermined function 850 may make use of input perception feedback 814.
- Another predetermined function 850 could be arranged to control a head limb of the character 812 so that the head limb remains oriented and facing towards a particular point or object within the virtual environment.
- Another predetermined function 850 could be to control the character 812 to simulate the character walking, running, or performing some other predetermined movement.
- Other abilities may, of course, be provided for by other predetermined functions 850.

Some of the predetermined functions 850 may be specific to an individual limb or limb type, thereby outputting a target configuration just in relation to that specific limb or limb type; other predetermined functions 850 may determine a target configuration that involves a plurality of limbs or limb types.

By making use of individual predetermined functions 850, the behaviour module 802 is made modular, which makes it easier to add and extend different aspects of character behaviour. For example, if a new ability for the character 812 is to be implemented, such as an ability to point a hand (at the end of an arm limb) at a location or object within the virtual environment, then a new predetermined function 850 for that ability may be created (in isolation) and added to the behaviour module 802 without affecting the already-existing predetermined functions 850.

It will be appreciated that the behaviour module 802 may be implemented itself as a single predetermined function 850 (albeit perhaps more complex and involved than the more modular approach set out above).

The behaviour module 802 takes the outputs from each predetermined function 850 and generates the target configuration 810 for the character 812. Some of the predetermined functions 850 may each wish to control how a particular limb is to be animated or moved. For example, if the set of input parameters 808 indicates that the character 812 has received a wound and is also being attacked, then one of the predetermined functions 850 that responds to the character 812 being "wounded" may wish to move an arm limb to cover the wound, whilst another one of the predetermined functions 850 that responds to the character 812 being "attacked" may wish to move that same arm limb so as to defend the character 812 from the attack. The behaviour module 802 may arbitrate between the outputs of multiple predetermined functions 850 in order to generate the output target configuration 810. This arbitration can be achieved in any suitable way, such as by forming the target configuration 810 as a weighted combination of the individual configurations output by each of the predetermined functions 850.

In the example embodiment described below, the controller module 804 makes use of so-called "inverse-kinematics" in order to determine how to control the object parts of the character 812. It will be appreciated, though, that the controller module 804 may make use of animation types other than "inverse-kinematics", such as "forward-kinematics", "forward-dynamics", "joint-space inverse-dynamics", and "task-space inverse-dynamics". A detailed description of example controller modules and these different types of animation can be found in US Patent Publication US2011/0267356, which is incorporated herein by reference.

Inverse-kinematics involves specifying, for one or more object parts (or for respective control frames 702 for the one or more object parts), a respective target position and orientation (e.g. a target frame 704). The inverse-kinematics processing then calculates one or more parameters for the joints of the virtual object 200 that would cause the one or more object parts (or their respective control frames 702) to have their position and orientation become coincident with (or at least approximately coincident with) those of the respective target frames 704. These calculated parameters may specify, for example, the angle of a joint (i.e. the angle between the two bones connected by that joint)—in this case, one or more of the parameters may actually be data explicitly defining that angle, although it will be appreciated that the angle of a joint may be set implicitly by other types of parameter. The parameters may specify additional or alternative properties of the joint—for example, if the joint allows for relative translations of the bones it is connecting (e.g. a prismatic joint), then one or more of the parameters may be data defining such a translation. It will be appreciated that inverse-kinematics processing may involve computing one or more of such joint parameters, and that other types of joint parameters may be computed in addition or as alternatives, depending on the nature of the joints and the type of representation being used to represent the character 812.

Hence, the output from the behaviour module 802 comprises, for each of the limbs, a target configuration for that limb. The target configuration may take many different forms. For example, the target configuration for a limb may specify a target frame 704 for one or more of the object parts making up that limb. In particular, the target configuration for a limb may specify a target frame 704 for the start object part and/or for the end object part of that limb, and possibly for one or more other object parts of that limb too.

As an example, the character 812 may represent an octopus, with the octopus having eight limbs (representing the eight tentacles of the octopus). Each limb may comprise a number (e.g. ten) object parts in sequence, so that an undulating form for the limb can be simulated. The behaviour module 802 outputs, for each limb, a target configuration. This target configuration may specify a target frame 704 for the start object part and for the end object part of the limb. The controller module 804, upon receiving this target configuration for the limb, may then determine (for example by using inverse-kinematics processing) how each of the object parts in the limb (which might not have had their own target frames specified in the target configuration) should be arranged so as to try to achieve the target configuration for the limb.

In preferred embodiments, the controller module 804 comprises, or is arranged to execute or use, a separate controller sub-module 860 (referred to herein as a "limb controller" 860) for each of the limbs. In particular, for each limb type (such as "arm", "leg", "spine", "neck", "head"), systems 800 according to embodiments of the invention may comprise code or object modules defining an associated limb controller 860 for that limb type. For example, there may be an "arm" limb controller 860 that is suitable for, and arranged to, receive a target configuration for an arm limb and to determine how to control the object parts of that arm limb in order to achieve that target configuration, whilst doing this in a manner deemed appropriate for an arm limb. The same applies analogously to other limb types. Then, if a character 112 has one or more limbs of a particular type, one or more corresponding instances of the limb controller 860 of that type can be instantiated, so that each of those limbs can have its own limb controller 860 of the appropriate type. Although the above describes a particular type of limb controller being used to control particular types of limb, it is not essential that each limb controller be specialised to a particular limb type and some embodiments use a shared, or "generic", limb controller which is instantiated for, and able to control, more than one type (or all types) of limb. Using a generic limb controller is advantageous in that it reduces the need for alteration or redesign of the system when a different character is being controlled.

For example, with the character 112 illustrated in FIG. 9, the controller module 804 comprises an "arm" limb controller 860-1 for the left arm limb, an "arm" limb controller 860-2 for the right arm limb, a "leg" limb controller 860-3 for the left leg limb, a "leg" limb controller 860-4 for the right leg limb, a "head" limb controller 860-6 for the head limb, and a "spine" limb controller 860-5 for the spine limb. It will be appreciated, of course, that for characters 112 with different sets of limbs the controller module 804 would be arranged to instantiate and execute correspondingly different sets of limb controllers 860. In alternative embodiments, as mentioned above, a generic type of limb controller can be used for more than one limb type, or for all limb types.

In this way, the control of a whole character 112 can be separated into separate control operations for individual limbs. This contributes to allowing the system 800 to control a multiplicity of differing character morphologies (e.g. shapes, sizes, geometry, number and configuration of joints) and multiple limb types (e.g. arms, legs, heads, spines, necks, etc.) using a shared, re-useable, implementation. For example, if a character 112 is to have two legs, then the controller module 804 for that character 112 may be instantiated with, and executed using, two corresponding leg limb controllers (or generic limb controllers) 860, whereas if a character 112 is to have eight legs, then the controller module 804 for that character 112 may be instantiated with, and executed using, eight corresponding leg limb controllers (or generic limb controllers) 860. The limb controller 860, as a module with corresponding code and functionality, can simply be reused or instantiated an appropriate number of times for each limb. Moreover, the same limb controller 860 could be reused for different characters, even if the limbs appear to be different (e.g. have differing topologies or geometries)—for example, a limb controller could be used to control the leg limbs of a humanoid character, and could also be used to control the "tentacle" leg limbs of an octopus character. This modularisation of control on a limb-by-limb basis therefore makes it easier to author a character 112 (as the author can simply specify the limbs involved for the character 112, and the controller module 804 can then select and use the appropriate limb controllers accordingly), whilst also making it easier to design and implement the functionality of how to control individual limb types (i.e. to specify the functionality of a limb controller to thereby set how limbs are actually to be controlled).

The input to a limb controller 860 may comprise one or more of the following information, which may be output as part of the target configuration 810 from the behaviour module 802:

- A vector describing a desired position of the start and/or end object part of the limb (and/or some other object part of the limb).
- A quaternion describing the desired orientation of the start and/or end object part of the limb (and/or some other object part of the limb).
- A vector describing the desired facing direction of the start and/or end object part of the limb (and/or some other object part of the limb)—e.g. a direction that should be lined up with a predetermined reference direction associated with that object part of the limb.
- Vectors describing the desired linear velocity and/or angular velocity of the start and/or end object part of the limb (and/or some other object part of the limb).
- A number of weight values that describe how strongly each of the various desired constraints mentioned above are to be achieved.
- Controller gains (amplification factors) like strength and damping.
- Physical properties such as
  - Collision—a flag denoting whether certain object parts in the limb should collide or pass through other objects.
  - Coefficients of friction and restitution.

It will be appreciated, however, that in some embodiments, the controller module 802 does not make use of separate limb controllers 860 and instead, receives the target configuration 810 and operates as a more single integrated controller to determine how to move or control the individual object parts of the character 812 as a whole.

The predetermined functions 850 may be generic functions, by which it is meant that they are not intended to be specific to any individual character 112. Such generic functions may, therefore, be used in relation to any type of character 112. In order to be able to share the same implementation of the behaviour module 802 between characters 112 that may have different topologies and/or geometries, embodiments of the invention make use of a conceptual (but not necessarily an actual or implemented or simulated) reference character for which any simulated "physical" quantity in the virtual environment can be specified, with this being specified independently of the actual type of character 112 that will ultimately be controlled and independently of the choice of measurement units that will ultimately be used for the actual character 112. Such specified quantities relating to the reference character are said to be defined in, or scaled according to, "reference character space", or more simply "reference space". For example, the reference space may specify distances/lengths in meters, whilst an actual character 112 to be animated may have its distances/lengths specified in centimeters; similarly, the reference space may have a distance of 1.5 m as being a reference distance (e.g. a height of the conceptual reference character), whereas the actual character 112 to be animated may have its distance (e.g. its actual height) as 20 cm or 900 cm.

Measurements (or parameters or values or other data) specified in the reference space may be scaled at runtime into a parameter space of the actual character 112 to be animated, referred to herein as "character space", so that these measurements in reference space are then scaled so as to be appropriate values for the actual character 112 to be animated. Similarly, measurements (or parameters or values or other data) specified for the character 112 to be animated (and hence specified in the character space) may be scaled at runtime into the reference space, so that these measurements in character space are then scaled so as to be appropriate values for the conceptual reference character.

The above scaling is performed using one or more scale factors that are associated with the actual character 112. Thus, the character 112 may have, in respect of one or more properties for the character 112, a respective scale factor specifying a value of the property for the character 112 relative to a reference value for that property (where this reference value may be a corresponding value for that property in the reference space for the conceptual reference character). Considering the examples given above, in which the reference space may specify distances/lengths in meters, whilst an actual character 112 to be animated may have its distances/lengths specified in centimeters, and in which the reference space may have a distance of 1.5 m as being a reference distance (e.g. a height of the conceptual reference character), whereas the actual character 112 to be animated may have its distance (e.g. its actual height) as 20 cm, then the scale factor associated with the length property for this particular character 112 would be 20/1.5=13.33 . . . . Here, the scale factor is found by dividing the character height of 20 cm by the reference distance. The resulting scale factor reflects the fact that the character height is specified in centimeters while the reference distance is specified in meters. By way of another example, for a character 112 having a height specified as 0.20 m, the resulting scale factor associated with the length property for that particular character 112 would be 0.2/1.5=0.1333 . . . . In this case, the scale factor reflects the fact that both distances are specified in meters. As a further example, for a character 112 having a distance (e.g. its actual height) specified as 900 cm, the scale factor associated with the length property for that particular character 112 would be 900/1.5=600. It will be appreciated that scale factors could be calculated by inverting the above fractions, so that the scale factors would then be 1.5/20=0.075 or 1.5/0.2=7.5 or 1.5/900=0.001666 . . . —this depends on whether embodiments multiply by a scale factor or divide by a scale factor. Examples of particular scale factors will be described in more detail later.

The scale factors may be computed offline for a character 112, before being used for an animation. Computing the scale factor(s) offline is advantageous in that it reduces the amount of computation required at runtime, thereby increasing performance.

The controller module 804 operates in character space, as does the optional physics module 806—i.e. the inputs to the controller module 804 and the optional physics module 806 are values that are specified in, and scaled for, the character space. However, in some embodiments, the controller module 804 and/or the optional physics module 806, may operate in reference space, with their outputs then being scaled to character space.

Each scale factor conflates two kinds of scale disparity—the dependence of character behaviour on the values assumed for properties of the character to be animated (such as its mass and height), and the dependence of the calculations by the behaviour module 802 on the choice of units used to define these various properties of the character 812. For example, for correct (i.e. natural-looking) behaviour, large characters should preferably move commensurately more slowly and smaller characters more swiftly because of their different inertial properties. As another example, the distance the character 812 steps when correcting balance should preferably be changed according to the size of the character 812. There are many other size-related characteristics which may be changed. What is more, the system 800 preferably acts the same for a character 200 units high as for 2 units high if the former is defined in centimeters and the latter in meters.

The behaviour module 802 is arranged to generate the target configuration 810 by using one or more of the scale factors associated with the character 112 being animated so that the target configuration 810 is scaled according to the values of the properties for the character 112, based in character space. This is described in more detail below.

In particular, each of the parameters in the set of input parameters 808 may be initially specified in the reference space, or may be initially specified in the character space. For example, an input relating to a user command might be represented in the reference space, while an input relating to perception feedback 814 due to the character's interaction with an object in the virtual environment might be represented in the character space. Let the set of input parameters be $\{x_1^R, \ldots, x_m^R, y_1^C, \ldots, y_n^C\}$, where a superscript "R" denotes a parameter whose value is specified in reference space and a superscript "C" denotes a parameter whose value is specified in character space. The number of parameters whose value is specified in reference space is m, which may be 0 or more; the number of parameters whose value is specified in character space is n, which may be 0 or more.

In one embodiment, the behaviour module 802 operates in the reference space, so that the predetermined functions 850 are designed and arranged to operate on values that are specified in the reference space. Thus, the input parameters $y_1^C, \ldots, y_n^C$ which have a value specified in the character space are scaled, using one or more of the scaling factors, so as to be represented according to the reference space. The inputs parameters $x_1^R, \ldots, x_m^R$ which already have a value specified in the reference space are not scaled. In this way, a new set of input parameters $\{x_1^R, \ldots, x_m^R, \bar{y}_1^R, \ldots, \bar{y}_n^R\}$ formed and is used to provide input parameters to the predetermined functions 850—here the values $\bar{y}_1^R, \ldots, \bar{y}_n^R$ are the values $y_1^C, \ldots, y_n^C$ scaled into the reference space. Once the predetermined functions 850 have operated on this set of input parameters, the target configuration generated by behaviour module 802 will, initially, assume values in the reference space (i.e. it will be a target configuration suitable for the conceptual reference character). The behaviour module 802 therefore scales, using the scale factors, the initial target configuration that it generates so that the values of the target configuration 810 output to the controller module 804 are in the character space.

By way of example, the input parameters 810 for the behaviour module 802 may specify that the character is to step to the side by 5 m, where this value is specified in character space (and hence is a distance suitable for the actual character 112 being animated). Assume that the distance scale factor for the character is 2.5. Then the behaviour module 802 scales this input parameter into reference space, so that the new input parameter is 5/2.5=2 units. The predetermined functions 820 then generate a target configuration for, say, a leg limb, where the target configuration would be suitable for the conceptual reference character. The behaviour module 802 then scales this target configuration, by multiplying any distance values of the target configuration by the scale factor 2.5 accordingly. The resulting target configuration is then suitable for the actual character 112 to be animated.

In another embodiment, the behaviour module 802 operates in the character space, so that the predetermined functions 850 are designed and arranged to operate on values that are specified in the character space. Thus, the inputs parameters $x_1^R, \ldots, x_m^R$ which have a value specified in the reference space are scaled, using one or more of the scaling factors, so as to be represented according to the character space. The inputs parameters $y_1^C, \ldots, y_n^C$ which already have a value specified in the character space are not scaled. In this way, a new set of input parameters $\{\bar{x}_1^C, \ldots, \bar{x}_m^C, y_1^C, \ldots, y_n^C\}$ is formed and is used to provide input parameters to the predetermined functions 850—here the values $\bar{x}_1^C, \ldots, \bar{x}_m^C$ are the values $x_1^R, \ldots, x_m^R$ scaled into the character space. Once the predetermined functions 850 have operated on this set of input parameters, the target configuration generated by behaviour module 802 will already assume values in the character space (i.e. it will be a target configuration suitable for the actual character to be animated).

By way of example, the input parameters 810 for the behaviour module 802 may specify that the character is to step to the side by 2 units, where this value is specified in reference space (and hence is a distance suitable for the conceptual reference character). Assume that the distance scale factor for the character is 2.5. Then the behaviour module 802 scales this input parameter into character space, so that the new input parameter is 2*2.5=5 m. The predetermined functions 850 then generate a target configuration for, say, a leg limb, where the target configuration would be suitable for the actual character 112 to be animated.

An advantage of this second embodiment is that it may require fewer scaling operations.

In both cases, the outputs from the behaviour module 802 are represented in "character space" so as to form a target configuration having values appropriate for the character 112. Embodiments of the invention remove all the scaling to outside the implementation of the generic predetermined functions 850. Thus, the behaviour module 802 (and the "abilities" or functions 850 defined therein) can be written using units and measurement sizes according to the reference space, as if they were animating the conceptual reference character, such that the author need not consider other characters having different topologies or geometries etc. In other words, the behaviour logic of the functions 850 can be viewed as being separated from the measurements/values being operated on, although this can be considered to be a somewhat conceptual view and, in practice, these two concepts may be implemented in a more integrated manner.

For example, a designer may produce a predetermined function 850 for the behaviour module 802, where this function is suitable for a notional human character of height 1.5 m and weight 70 kg. This same predetermined function 850 may then be used within the behaviour module 802 in respect of such a human character (of height 1.5 m and weight 70 kg), or in respect of a dwarf warrior character (of height 0.7 m and weight 50 kg), or in respect of a giant robot character (of height 4 m and weight 500 kg), etc.—in particular, the scaling carried out between the character and reference spaces enables the same generic predetermined function 850 to be used, whilst the ultimate target configuration 810 produced by the behaviour module 802 is scaled so that it is appropriate to the particular character. For example, the "balance" function 850 can choose to cause a footstep a particular distance in the reference space, and this will be scaled so as to be appropriate for all characters 112; or a shield ability can choose to raise an arm at a certain speed within a certain reaction time in the reference space, and this will also be scaled correctly so as to generate an appropriate target configuration 810 for the character 112. In some embodiments, the quantities/variables specifying a movement or action (e.g. a distance to be stepped, an angle to rotate, a speed or acceleration of movement, etc.) may form one or more of the input parameters 808 to the function 850, which are then scaled accordingly. In embodiments where the predetermined function 850 operates in character space, any input parameters 808 specified in reference space are scaled to character space before being operated on by the procedural code of the function 850. In embodiments where the predetermined function 850 operates in reference space, any input parameters specified in character space are scaled to reference space before being operated on by the procedural code of the function, and the function may also include hard-coded parameters specified in the reference space.

Although, as stated above, the scaling is conceptually removed to outside the function, particular implementations of a function may mix procedural code with parameters (either hard-coded parameters or input parameters as described above), but with those parameters being wrapped in calls to suitable scaling functions or procedures so as to ensure that those parameters are scaled appropriately into the correct "space" before being operated on. Thus, it is not essential that all of the scaling operations are carried out exclusively outside of, or separated from, the predetermined function, provided that the parameters are scaled appropriately before being operated on.

Thus, re-use of the generic predetermined functions 850 is facilitated for characters 112 having different sizes, topologies and geometries. This leads to a significant saving in time and effort on the part of a designer of this animation system 800.

Figure 10A:
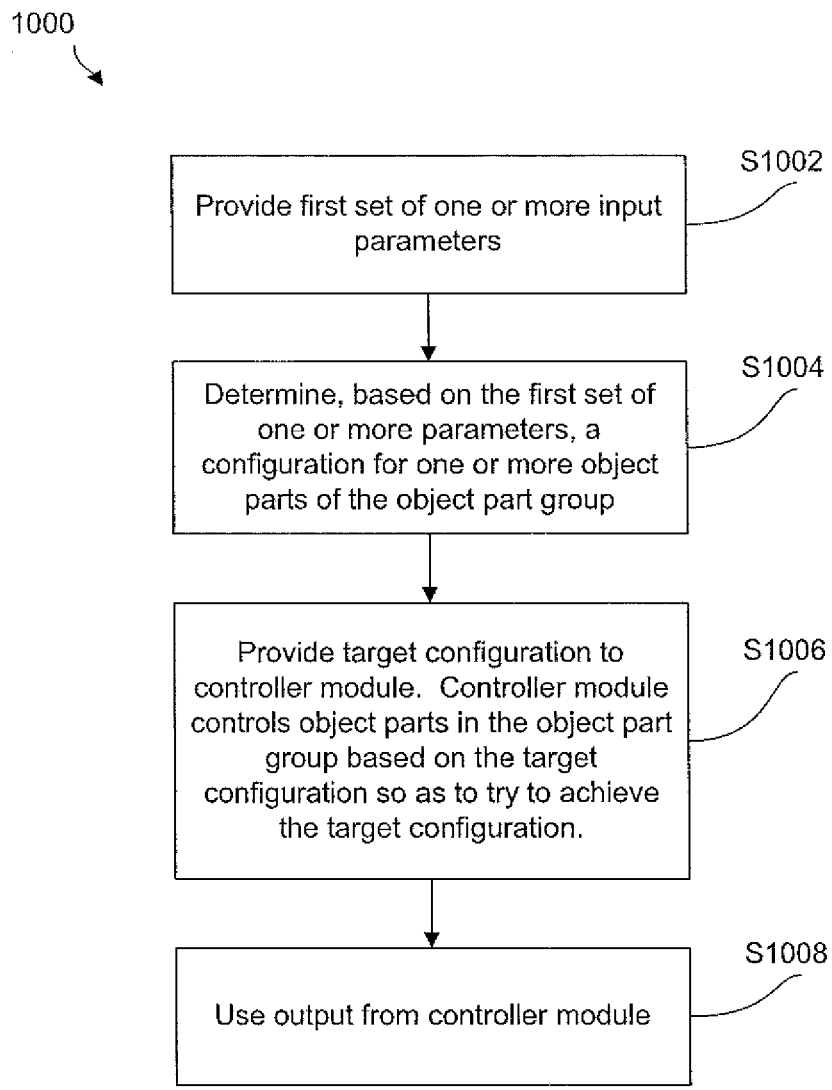
FIGS. 10a-10c are flowcharts schematically illustrating methods according to embodiments of the invention.

FIG. 10*a* is a flowchart schematically illustrating an overview of embodiments of the invention. The method 1000 illustrated in FIG. 10*a* relates to the processing performed for a next animation update step for the animation and in respect of one of the object part groups.

In particular, at a step S1002, a first set of one or more parameters 810, relating to the next step of the animation, are provided to one or more of the predetermined functions 850.

At a step S1004, the one or more predetermined functions 850 determine, based on the first set of one or more parameters 810, a configuration for one or more object parts of the object part group.

The steps 1002 and 1004 together result in the generation of a target configuration 810 for one or more object parts of the object part group. This generation uses one or more of the one or more scale factors associated with the character 112 so that the target configuration 810 is scaled according to the values that the character 112 assumes for one or more properties of the character (i.e. the target configuration 810 is scaled so that its values are in the character space).

At a step S1006, this target configuration is provided to the controller module 804 (and, in some embodiments, this would be to a particular limb controller of a type corresponding to the type of the current object part group). The controller module 804 is, as explained above, arranged control the object parts in the object part group based on the target configuration 810 so as to try to achieve the target configuration 810.

At a step S1008, data from the controller module 804 may be used for the animation. In particular, the geometry of the character 112 may be updated to reflect the output of the controller module 804—this may involve using the optional physics module 806. A rendering module (not shown) may display the resulting animation on the monitor 120. Data representing the animation may be stored for later use.

Figure 10B:
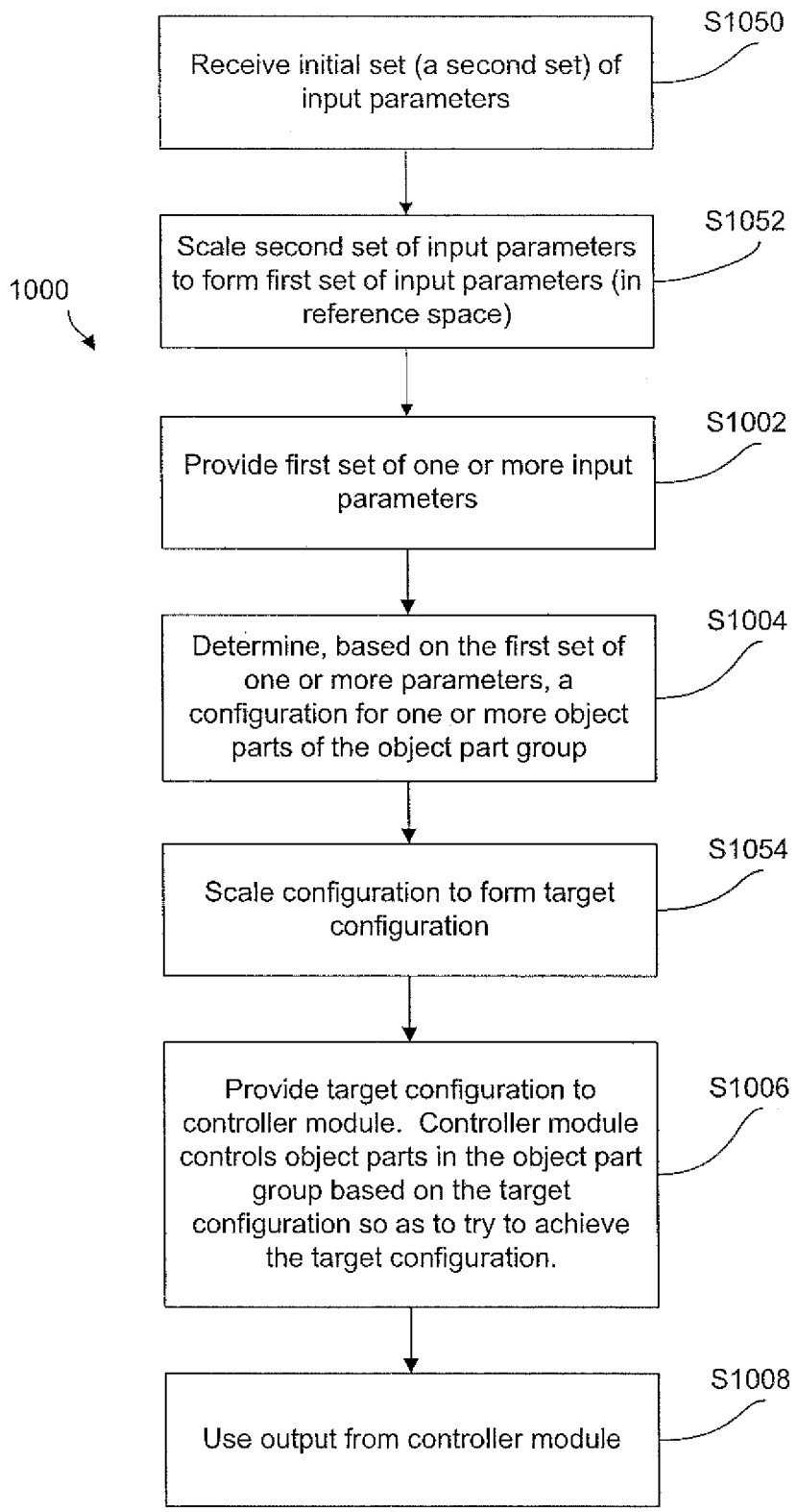

FIG. 10*b* is a flowchart schematically illustrating the method 1000 when it relates to the embodiments described above in which the predetermined functions 850 operate on input parameters whose values are in reference space.

As shown, the method comprises a step S1050 at which the initial input parameters are received (as a second set of one or more parameters).

At a step S1052, this second set of one or more parameters is modified to form the first set of one or more parameters for use in the steps S1002 and S1004, so that all parameters of the first set of one or more parameters are scaled according to reference values for the one or more properties.

Once a configuration has been determined at the step S1004, a step S1054 scales the determined configuration using the one or more scale factors to generate the target configuration 810 which is provided to the controller module 804 at the step S1006.

Figure 10C:
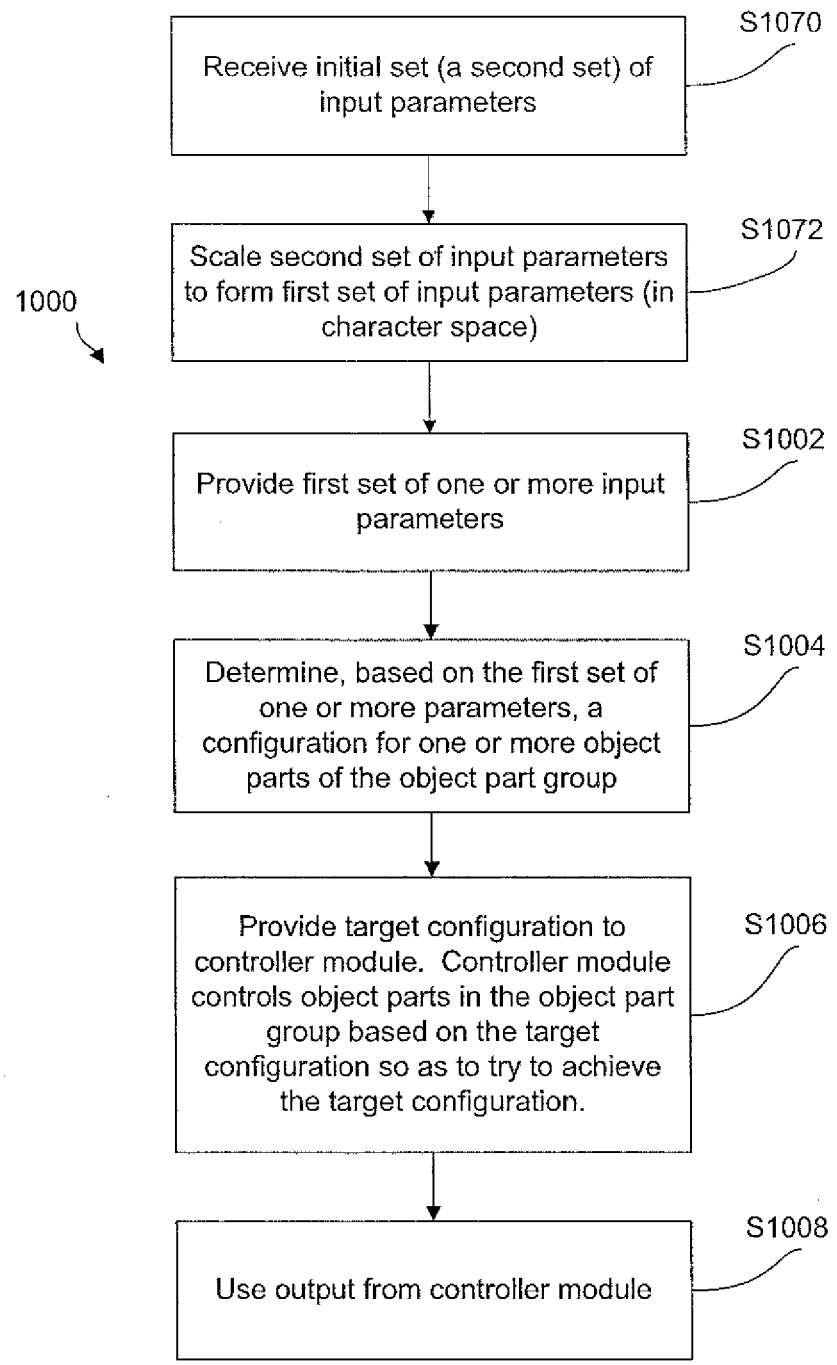

FIG. 10*c* is a flowchart schematically illustrating the method 1000 when it relates to the embodiments described above in which the predetermined functions 850 operate on input parameters whose values are in character space.

As shown, the method comprises a step S1070 at which the initial input parameters are received (as a second set of one or more parameters).

At a step S1072, this second set of one or more parameters is modified to form the first set of one or more parameters for use in the steps S1002 and S1004. This is achieved by scaling one or more parameters of the second set of parameters using the one or more scale factors so that all parameters of the first set of one or more parameters are scaled according to the values that the character 112 assumes for the one or more properties of the character 112 (i.e. the target configuration is scaled so that its values are in the character space).

The generation of scale factors will now be described. In embodiments of the invention, there are reference values for mass, length and time based on a conceptual reference character, and these can be used as necessary to generate scale factors for these basic dimensions to convert any value into a (canonical) reference frame. For example:

Scaled length=length×length scale factor

Scaled velocity=velocity×length scale factor/time scale factor

Scaled acceleration=acceleration×length factor scale/(time factor scale×time scale factor)

Scaled inertia=inertia×mass scale factor×length scale factor×distance scale factor Scaled force=force×mass scale factor×length scale factor/(time scale factor×time scale factor)

In general any value can be scaled by breaking its units down into their components of mass M, length L, and time T, and multiplying each term by its scale. There are other basic physical dimensions, for instance charge and absolute temperature, which could be used if necessary. Accordingly, if a value X is expressed in dimensions of $M^m L^n T^p$, and the scale factors for mass, length and time are $S_M$, $S_L$ and $S_T$ respectively, the scaled value S(X) is given by:

$$S(X)=X \cdot S_M^m S_L^n S_T^p$$

Obtaining the value X from the value S(X) is then simply a matter of calculating:

$$X = \frac{S(X)}{S_M^m S_L^n S_T^p}$$

In some embodiments of the invention, the reference distance is the height of the reference character in meters, so the distance scale factor is generated by using the reference character height and the equivalent measurement of the user character (where each quantity is measured in the units used to represent length for that character, e.g. meters):

length scale=height of user character/height of reference character

For example, if the height of the reference character is 1.5 m and the height of the user character is 2 m, then the length scale factor for that user character is 2/1.5=1.333 . . . , whereas if the height of the user character is 200 cm (due to the user character's lengths being defined in centimeters), then the length scale factor for that user character is 200/1.5=133.333 . . . .

The same principle applies to the other scale factors: the reference mass may be the reference character's overall mass in kilograms; and the reference time may be the time (in seconds) it takes the reference character to fall its own height under a predetermined gravitational acceleration (e.g. an acceleration set by a user, or by the designer of the predetermined function 850).

It will be appreciated that embodiments of the invention may make use of other definitions of reference length, mass and time and that the above are merely examples.

Scale factors may be generated similarly for other properties. For example, if the scale factors for mass, length and time are $S_M$, $S_L$ and $S_T$ respectively, then a scale factor for velocity, $S_V$, may be calculated as $S_V=S_L/S_T$. Whilst the basic scale factors $S_M$, $S_L$ and $S_T$ could be used for all scaling operations (as set out above), the use of more explicit scale factors for certain properties, such as calculating and using the scale factor $S_V$, means that fewer computations are required during runtime.

Thus, for one or more properties or attributes or units (such as length, mass, time, inertia, velocity, etc.) for a character 112, a scale factor may be calculated and stored in association with that character 112. The scale factor for a property specifies a value that the property assumes for the character relative to a reference value for that property.

In some embodiments, the character has a scale factor for angle units. Angles do not change with character size, but the units can change between, for example, revolutions, radians and degrees in specifying certain character properties.

It will be appreciated that ways of calculating the scale factors, other than calculating a ratio of a measurement of the character and a reference measurement, could be used. For example, instead of calculating explicit ratios of values, as set out above, in some embodiments, a scale factor could assume a value from a predetermined set of values. For example, there may be a predetermined set of {0.1, 0.2, 0.5, 1, 2, 4, 10, 20, 100} for a length scale factor. The actual scale factor assigned to a character may be the closest one out of these values to the actual ratio that would be calculated. This may simplify the scaling operation(s), leading to increased performance.

It should be noted that the above measurements of quantities of the conceptual reference character are examples of measurements that have an equivalent on any character and that will act as a good representative of scale in that dimension. As mentioned, other measurements could be used, however. For example, the reference distance could be the accumulated length of all of the reference character's bones—this would make the resulting scale factor adapt to the "build" of the character (i.e. so a very wide character would have a different scale factor to a very thin character, even if the characters were the same height). The choice of measurement(s) depends on which aspects of the character's behaviour need to be adjusted for scale and for what reasons. Also, different scale factors can be used for different types of behaviour (i.e. different functions 850 within the behaviour module 802 can use different scaling factors for the same property).

The combination of the above scaling and the above-described concept of limb abstraction using individual separate limb controllers 860 enables animation of a wide range of characters (having differing topologies, geometries and other characteristics) without needing a different implementation for each. In particular, generic functions 850 can be defined and generic controllers 860 can be defined and instantiated and executed as necessary, thereby having a more generic and flexible animation system 800. This leads to a great saving in development time for writing and supporting the animation system 800, whilst also making it easier and quicker to create an animation of a newly defined character.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality and modules may be implemented as hardware and/or software. For example, the above-mentioned modules may be implemented as one or more software components for execution by a processor of the system. Alternatively, the above-mentioned modules may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for forming an animation of a virtual object within a virtual environment, the virtual object comprising a plurality of object parts, there being one or more predetermined object part groups, each object part group being a sequence of linked object parts of an animated limb, the virtual object having, in respect of one or more properties for the virtual object, a respective scale factor specifying a value of a property for the virtual object relative to a reference value for the property, the method comprising, for each object part group of the one or more predetermined object part groups:

providing a first set of one or more parameters including a user input from a user input interface, relating to a next step of the animation, to a predetermined function, wherein a particular object part from the object part group is flagged according to a collision flag denoting whether the particular object part passes through other objects or collides with other objects;

the predetermined function determining, based on the first set of one or more parameters including the user input from the user input interface, a configuration for one or more object parts of the object part group;

generating a time factor specifying a value of a time taken for the virtual object to fall from a height of the virtual object under influence of a predetermined acceleration relative to a reference time taken for a reference object to fall from a height of the reference object; and generating a target configuration based on utilizing one or more scale factors including the generated time factor, the scale factors being used to scale the one or more object parts to the target configuration according to values of the one or more properties for the virtual object including the generated time factor.

2. The method of claim 1 further comprising:
receiving a second set of one or more parameters;
modifying the second set of one or more parameters to form the first set of one or more parameters so that all parameters of the first set of one or more parameters are scaled according to reference values for the one or more properties; and
scaling the determined configuration using the one or more scale factors to generate the target configuration.

3. The method of claim 1 further comprising:
receiving a second set of one or more parameters; and
modifying the second set of one or more parameters to form the first set of one or more parameters by scaling one or more parameters of the second set of parameters using the one or more scale factors so that all parameters of the first set of one or more parameters are scaled according to the values of the one or more properties for the virtual object.

4. The method of claim 1 wherein each scale factor represents a ratio between the value of the respective property for the virtual object and a reference value for that property.

5. The method of claim 1 wherein at least one of the scale factors is pre-computed.

6. The method of claim 1 wherein each scale factor relates to one of mass, length and time units.

7. The method of claim 6 wherein a length scale factor is defined as a value of a height property of the virtual object relative to a reference height.

8. The method of claim 6 wherein a length scale factor is defined as a value of a combined length of a particular set of the object parts of the virtual object, relative to a reference length.

9. The method of claim 6 wherein a mass scale factor is defined as the value of a mass property of the virtual object relative to a reference mass.

10. The method of claim 1 wherein each scale factor is a combination of two or more sub-scale factors, each sub-scale factor relating to one of mass, length and time units.

11. The method of claim 1 wherein the predetermined function corresponds to a particular type of object part group.

12. The method of claim 11 wherein the type of object part group is one of an arm group, a leg group, a spine group and a head group.

13. The method of claim 1 further comprising the step of rendering an animation update step, the rendering at least partially based upon the target configuration.

14. The method of claim 13 further comprising the step of displaying the rendered animation update step on a display.

15. The method of claim 1 wherein the predetermined function determines the determined configuration based at least partially upon functionality relating to one or more behavioural abilities of the virtual object.

16. The method of claim 15 wherein the behavioural abilities include one or more abilities relating to at least one of balance, hazard protection, wound response, pointing, looking and aiming.

17. The method of claim 15 wherein the predetermined function determines the determined configuration based at least partially upon functionality relating to a plurality of the abilities, and resolves between the plurality.

18. The method of claim 17 wherein the resolving is based upon one or more weighting parameters that define how strongly each of the abilities are to be acted upon.

19. A system for forming an animation of a virtual object within a virtual environment, the virtual object comprising a plurality of object parts, there being one or more predetermined object part groups, each object part group being a sequence of linked object parts of an animated limb, the virtual object having, in respect of one or more properties for the virtual object, a respective scale factor specifying a value of a property for the virtual object relative to a reference value for the property, the system comprising a processor arranged to, for each object part group of the one or more predetermined object part groups:
   providing a first set of one or more parameters including a user input from a user input interface, relating to a next step of the animation, to a predetermined function, wherein a particular object part from the object part group is flagged according to a collision flag denoting whether the particular object part passes through other objects or collides with other objects;
   the predetermined function determining, based on the first set of one or more parameters including the user input from the user input interface, a configuration for one or more object parts of the object part group;
   generating a time factor specifying a value of a time taken for the virtual object to fall from a height of the virtual object under influence of a predetermined acceleration relative to a reference time taken for a reference object to fall from a height of the reference object; and
   generating a target configuration based on utilizing one or more scale factors including the generated time factor, the scale factors being used to scale the one or more object parts to the target configuration according to values of the one or more properties for the virtual object including the generated time factor.

20. A non-transitory storage medium storing a computer program which, when executed by a computer, carries out a method for forming an animation of a virtual object within a virtual environment, the virtual object comprising a plurality of object parts, there being one or more predetermined object part groups, each object part group being a sequence of linked object parts of an animated limb; the virtual object having, in respect of one or more properties for the virtual object, a respective scale factor specifying a value of a property for the virtual object relative to a reference value for the property, the method comprising, for each object part group of the one or more predetermined object part groups:
   providing a first set of one or more parameters including a user input from a user input interface, relating to a next step of the animation, to a predetermined function;
   the predetermined function determining, based on the first set of one or more parameters including the user input from the user input interface, a configuration for one or more object parts of the object part group;
   wherein a particular object part from the object part group is flagged according to a collision flag denoting whether the particular object part passes through other objects or collides with other objects;
   generating a time factor specifying a value of a time taken for the virtual object to fall from a height of the virtual object under influence of a predetermined acceleration relative to a reference time taken for a reference object to fall from a height of the reference object; and
   generating a target configuration based on utilizing one or more scale factors including the generated time factor, the scale factors being used to scale the one or more object parts to the target configuration according to values of the one or more properties for the virtual object including the generated time factor.

* * * * *

UNITED STATES PATENT AND TRADEMARK OFFICE
CERTIFICATE OF CORRECTION

PATENT NO. : 9,449,416 B2  
APPLICATION NO. : 13/408049  
DATED : September 20, 2016  
INVENTOR(S) : Chapman et al.

Page 1 of 1

It is certified that error appears in the above-identified patent and that said Letters Patent is hereby corrected as shown below:

In the Drawings

Sheet 6 of 12, Figure 6, reference numeral 106, delete "106" and insert --600--, therefor In the Specification In Column 14, Line 13, delete "806" and insert --812--, therefor In Column 18, Line 2, delete "802" and insert --804--, therefor In Column 20, Line 9, delete "formed" and insert --is formed--, therefor In Column 20, Line 22, delete "810" and insert --808--, therefor In Column 20, Line 30, delete "820" and insert --850--, therefor In Column 20, Line 57, delete "810" and insert --808--, therefor In Column 21, Line 26, delete "50 kg)," and insert --60 kg),--, therefor In the Claims In Column 28, Line 13, in Claim 20, delete "limb;" and insert --limb,--, therefor Signed and Sealed this  
Fourth Day of June, 2019

Andrei Iancu  
*Director of the United States Patent and Trademark Office*